Aug. 24, 1937.    M. A. DAVIS    2,090,784
MOLDING MACHINE
Filed June 22, 1935    3 Sheets-Sheet 1
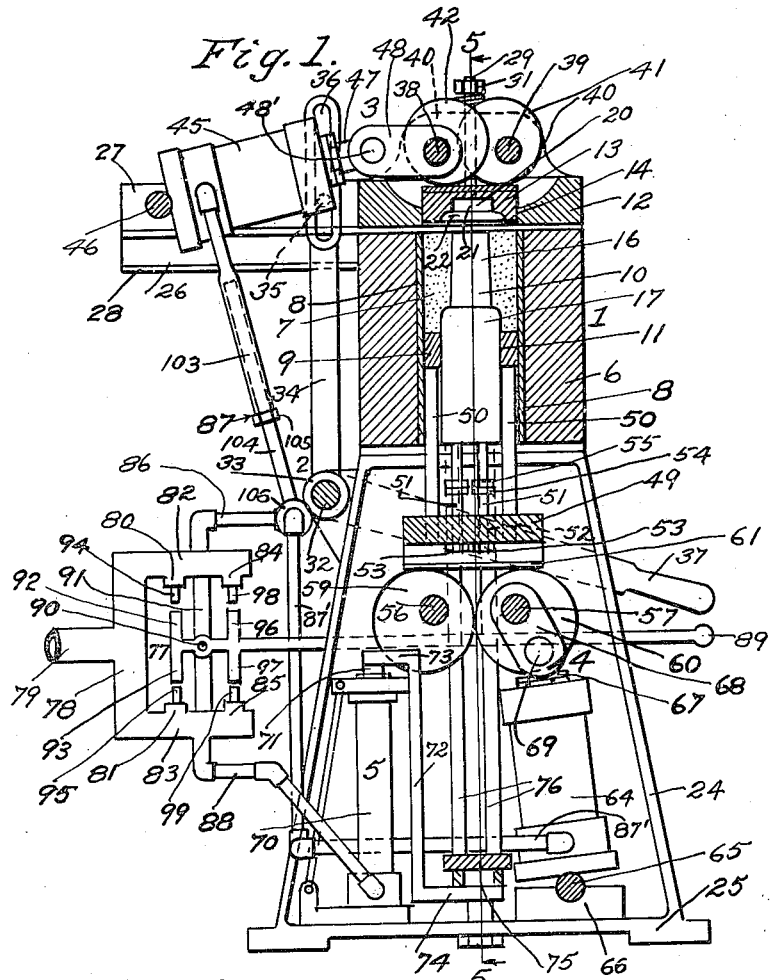
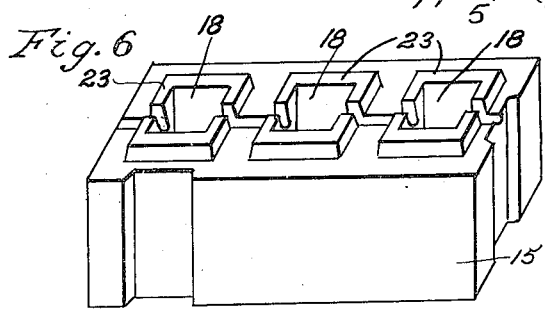
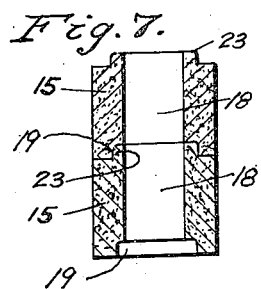
INVENTOR.
MORRIS A. DAVIS,
BY
Alan Franklin
ATTORNEY.

Aug. 24, 1937.  M. A. DAVIS  2,090,784
MOLDING MACHINE
Filed June 22, 1935  3 Sheets-Sheet 2
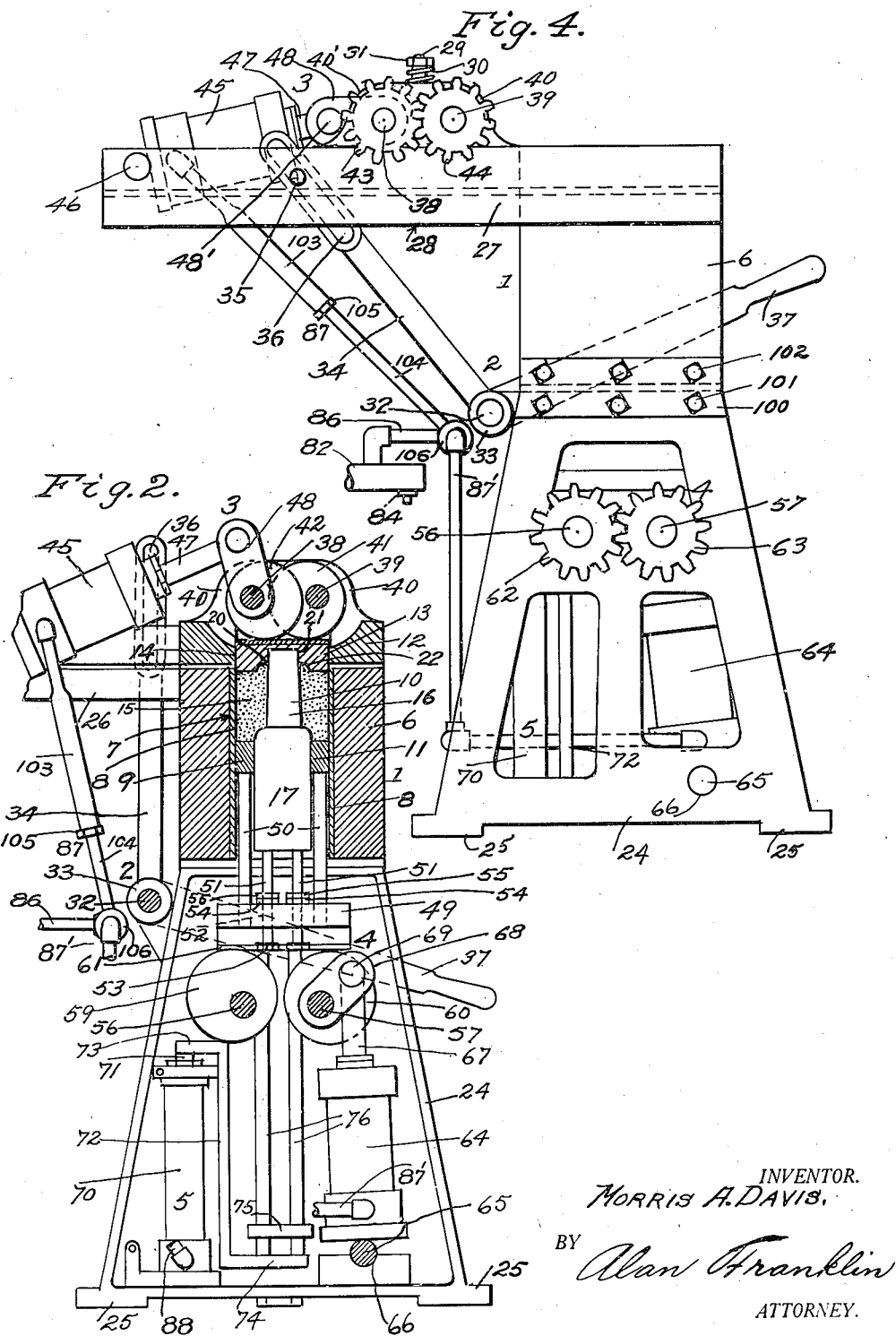
INVENTOR.
MORRIS A. DAVIS.
BY Alan Franklin
ATTORNEY.

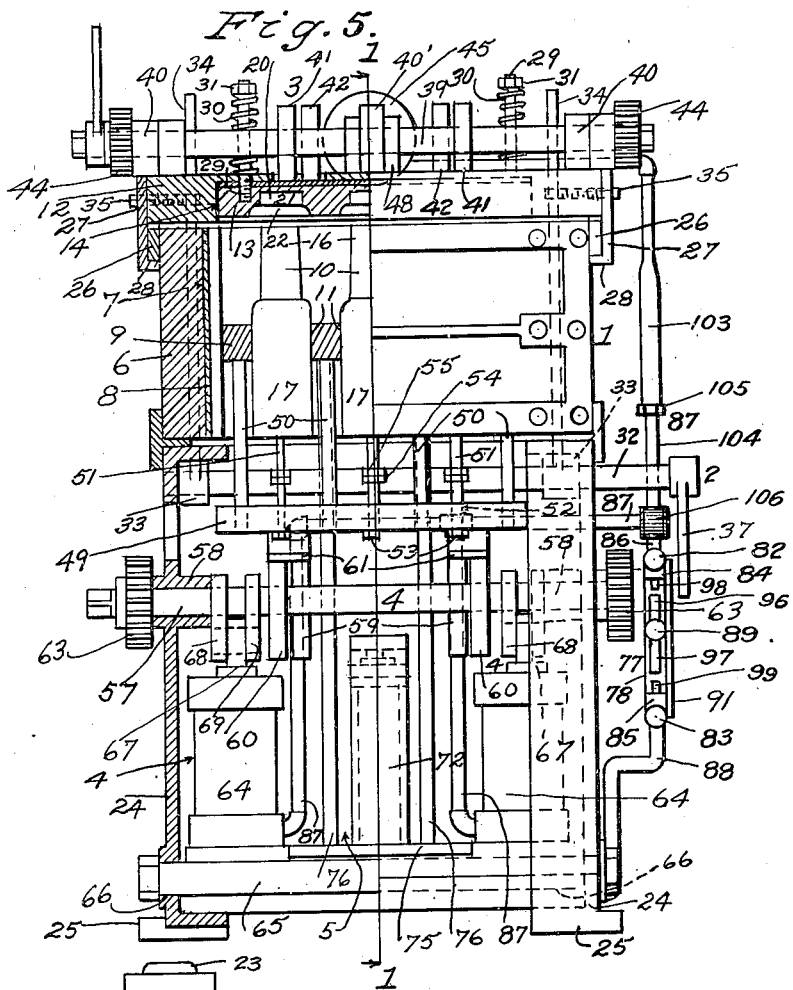

Patented Aug. 24, 1937

2,090,784

UNITED STATES PATENT OFFICE 2,090,784

MOLDING MACHINE

Morris A. Davis, Los Angeles, Calif.

Application June 22, 1935, Serial No. 27,925

5 Claims. (Cl. 25—41)

This invention relates to molding machines, and more particularly to machines for molding hollow fictile blocks or tile, such as used in buildings or general construction.

The principal object of the invention is to provide a molding machine of the character stated in which the plastic material is compressed in the mold under power.

Another object is to provide a molding machine of the character stated by means of which all of the molding operations are performed under power.

Another object is to provide a molding machine of the character stated, which is simple in construction, practical, and rapid and efficient in operation.

Other objects and advantages will appear hereinafter as this specification progresses.

The invention is illustrated in the annexed drawings, which form a part of this specification, and in which, Fig. 1 is a longitudinal vertical section of my molding machine, taken on line 1—1 of Fig. 5, showing the mold closed and in position ready for compressing the plastic material therein for molding a block.

Fig. 2 is a view like Fig. 1, except that the mold is shown in position compressing the plastic material and molding a block therein.

Fig. 3 is a view like Fig. 1, except that the mold is shown open and the molded block is shown ejected from the mold of the machine.

Fig. 4 is a side elevation of my molding machine, showing the mold open for filling the same with plastic material.

Fig. 5 is a view of my molding machine, shown partly in front elevation and partly in transverse vertical section, taken on the line 5—5 of Fig. 1.

Fig. 6 is a perspective of one of the building blocks molded by my machine.

Fig. 7 is a vertical transverse section of two interlocking building blocks molded by my molding machine.

Referring more particularly to the drawings, in which the same reference characters designate the same parts in all of the figures, 1 designates a collapsible and interchangeable mold; 2 designates means for swinging the mold head into closed or open position; 3 power means for applying pressure to the head member of the mold during the molding operation; 4 power means for raising or lowering the mold base and the mold core in the mold for compressing the plastic material in the mold during the molding operation; and 5 power means for raising the mold base for ejecting the molded block from the mold.

The mold 1 comprises a mold box 6, preferably of metal, such as cast iron, formed with a mold opening 7, extending vertically therethrough, a mold lining 8, detachably fitted in said mold opening 7, a mold base 9 slidably fitted in said lining, a mold core 10 extending vertically through said lining and through an opening 11 in said base, and slidable within said base opening, a mold head 12 to fit over the top of said mold box 6, and a mold-head die 13, slidably fitted in a recess 14 in the under side of said head, to slide vertically in said recess, into and out of the upper end of said mold lining 8. The form of the lining 8 determines the shape of the block or tile 15, which is cast in the mold 1, and said lining may be of any suitable material, such as cast iron, steel, or brass. Said lining is replaceable in the mold, whereby the life of the mold is increased. The core 10 is formed with a major portion 16 and an enlarged base portion 17, said major portion being adapted to form an opening 18 extending through the block 15, and said enlarged base being adapted to form a rabbet 19 at the lower end of said opening 18 in the lower side of said block, which rabbet forms the female member of an interlocking joint between the two adjacent blocks 15. The sides of the major portion 16 of the core converge slightly upwardly so that the core may be readily withdrawn from the molded block. The mold-head die 13 is formed with a recess 20 in its under side to receive the upper end of the major portion 16 of the core 10, the upper portion 21 of said recess being of such size and form as to fit snugly said upper end of said major portion of the core, and the lower portion 22 of said recess being larger than the cross-sectional area of said major portion of the core, so as to form a boss 23 on the upper side of the block 15, surrounding the upper end of the block opening 18, which boss is adapted to fit in the rabbet 17 in the under side of an adjacent block 15 and forms the male member of the interlocking joint between two adjacent or superimposed blocks 15. The mold 1 may be of any desirable size or shape and may have one or more cores for molding blocks with one or more openings 18 and interlocking joints, as illustrated in Fig. 6 of the drawings.

The mold 1 is mounted on the top of a frame 24, which is formed with a base 25 adapted to rest upon a floor or other suitable foundation.

The head 12 is mounted to slide horizontally on horizontal tracks 26, secured to the opposite sides of the mold box 6, at the upper side edges thereof, and guide plates 27, secured to the sides of said head, depend from said head over the outside of said tracks 26 and have their lower ends 28 bent inwardly under the lower edges of said tracks, whereby said head is held in position on the machine against lateral displacement and against being lifted off said tracks.

Pins 29, secured at their lower ends in the mold-head die 13, extend upwardly from said die through the head 12 and are surrounded by coil springs 30, which bear at their lower ends against the upper side of said head and at their upper ends against nuts 31, which are screw-seated on the upper ends of said pins, whereby said die 13 is normally held in its uppermost position in the recess 14 in said head.

The manual means 2 for swinging the mold head 12 into closed or open position comprises a horizontal shaft 32, journaled in bearings 33 on the rear side of the frame 23, a pair of arms 34, secured at their lower ends on said shaft and extending upwardly from said shaft, between the guide plates 27, which extend rearwardly from the head 12, studs 35 projecting from the inner sides of said guide plates, at the rear of said head, through longitudinal slots 36 in the upper ends of said arms, and an operating arm 37, secured on said shaft 32 and extending forwardly through and in front of the machine.

The power means 3 for applying pressure to the mold-head die 13 during the molding operation, comprises a pair of horizontal cam shafts 38 and 39, journaled in bearings 40 and 40', upstanding from the head 12; cams 41 and 42 secured on said shafts respectively, for engaging the upper side of said die; intermeshing pinions 43 and 44 secured on the ends of said cam shafts 38 and 39 respectively; a power cylinder 45, mounted at its rear end on a horizontal rock shaft 46, which is journaled at its ends in the rear ends of the head guide plates 27; a reciprocative piston 47 in said power cylinder; and a crank 48 secured on the cam shaft 38 and straddling said bearing 40; and pivotally connected at its swinging end, by a pivot 39, to the outer end of said piston.

The power means 4 for raising or lowering the mold base 9 and the mold core 10 in the mold 1 comprises a bridge 49, pins 50 secured at their lower ends in said bridge and upstanding therefrom into said mold under said mold base; pins 51 depending from the lower end of the mold core 10 through openings 52 in said bridge; nuts 53 screw-seated on the lower ends of said pins 51 beneath said bridge; adjusting nuts 54 and lock nuts 55 screw-seated on said pins 51 above said bridge; horizontal cam shafts 56 and 57 journaled in bearings 58 in the frame 24; cams 59 and 60, secured on said cam shafts respectively, and engaging shoes 61 on the under side of said bridge 49; intermeshing pinions 62 and 63 secured on the ends respectively of said cam shafts 56 and 57; power cylinders 64 mounted at their lower ends on a rock shaft 65 turnably mounted in a bearing 66 on the base 25 of frame 24; pistons 67 in said power cylinders; and cranks 68 secured on said cam shaft 57 and pivotally connected by pivots 69 to the upper ends of said pistons 67.

The power means 5 for raising the mold base for ejecting the molded block from the mold comprises a vertical power cylinder 70 mounted on the frame base 25; a reciprocative piston 71 slidable in said cylinder; a vertical connecting member 72, the upper end of which is bent at right angles and connected at 73 to the upper end of said piston 71, and the lower end of which is bent at right angles to form a seat 74; a horizontal bridge bar 75 mounted on said seat; and a plurality of vertical push rods 76 secured at their lower ends to said bridge bar 75 and extending upwardly into the mold 1 under the mold base 9 at opposite sides of the mold core 10.

My molding machine may be operated by any suitable power medium such as compressed air or water-power, and power-operating means 77 are provided for supplying and controlling the compressed air or water-power for operating the pistons 47, 67 and 71 in the power cylinders 45, 64 and 70 respectively, which operating means comprises a U-shaped valve duct 78, connected intermediate its ends to a supply pipe 79 for supplying compressed air or water under pressure to said duct; a pair of inlet valves 80 and 81 in the arms 82 and 83 respectively, of said valve duct; a pair of exhaust valves 84 and 85 in said duct arms 82 and 83 respectively, beyond said inlet valves 80 and 81 respectively; a pipe 86 leading from the duct arm 82 from between the inlet valve 81 and the exhaust valve 84, to another pipe 87, one end of which pipe 87 leads into the outer end of the cylinder 45, while its other end leads into the lower end of the cylinder 64; a pipe 88 leading from the duct arm 83, from between the inlet valve 81 and the exhaust valve 85, into the lower end of the cylinder 70; and a valve-operating lever 89, pivoted near its rear end at 90 to a cross bracket 91, extending between the arms 82 and 83 of the valve duct 78, and secured at its ends respectively to said arms, said lever extending forwardly through and in front of the machine. On the rear end of said lever 89 are a pair of pins 92 and 93 for alternately engaging and depressing the stems 94 and 95 of the inlet valves 80 and 81, as said lever is swung down or up, for alternately opening said valves. A pair of pins 96 and 97 are formed on the lever 89 for alternately engaging and depressing the stems 98 and 99 of the exhaust valves 84 and 85, as said lever is swung up or down, for alternately opening said exhaust valves.

The operation, uses and advantages of my invention are as follows:

Assuming the mold head 12 to be moved rearwardly from the mold 1, as shown in Fig. 4 of the drawings, and the remaining mechanism of the machine to be in the position shown in Fig. 1, the mold is first filled, through the open top thereof, with any suitable plastic material, which rests upon the mold base 9, within the mold lining 8 and around the mold core 10. The operating lever 37 is grasped by the operator and swung down, which, through the medium of the arms 34 and the pins 35, engaging the forward edges of the arm slots 36, moves the mold head 12 over the top of the mold 1, and closes the mold, as shown in Fig. 1 of the drawings. The operating lever 89 is then swung down and until its pin 92 depresses the stem 94 of the inlet valve 80 and opens said valve, whereupon fluid under pressure passes from the valve-duct arm 82 through the pipe 86 and pipe 87 into the rear end of the power cylinder 45 and into the lower end of the power cylinder 64. Said fluid entering the rear end of cylinder 45 forces the piston 47 forwardly, which swings the crank 48, cam shaft 38, cams 41 and pinions 43 clockwise, and said pinions, meshing with the pinions 44, swing said pinions 44, cam shaft 39 and cam 42 counterclockwise, so that said cams 41 and 42 engage the upper surface of the head die 13 and force said die downwardly into the upper end of the mold within the lining 8, as shown in Fig. 2 of the drawings, while said fluid entering the lower end of the cylinders 64 forces the pistons 67 upwardly and swings the cranks 68, cam shaft 57, cams 60 and pinions 63 counterclockwise, and said pinions, meshing with pinions 62, swing said pinions 62, cam shaft 56 and cams 59 clockwise, whereupon said cams 59 and 60, engaging the lower bridge surfaces 61, force the bridge 49 and the pins 50 upwardly, and said bridge, engaging nuts 54, forces the pins 51 and the mold core 10 upwardly until the upper end of the core portion 16 enters the recess 20, of the die 13, and seats in the upper portion 21 of said recess, during which operations the upper ends of the pins 50 engage the under side of the mold base 9 and force said base upwardly, compressing the plastic material in the mold above said base into shape and molding the block with the rabbet 17 in the lower side of the block and the boss 23 on the upper side of said block. The valve-operating lever 89 is then swung up until its pin 92 disengages the valve stem 94 and allows the inlet valve 80 to close, under the influence of its spring, and its pin 96 depresses the valve stem 98 and opens the exhaust valve 84, whereupon the fluid in the cylinders 45 and 64 is exhausted through the pipes 87 and 86, duct arm 82 and exhaust valve 84, and the springs 29 draw the die 13 upwardly out of the upper end of the mold 1, which upward movement of said die rotates the cams 41 and 42 respectively in a counterclockwise and clockwise direction, and such rotation of the cam 41 correspondingly rotates the cam shaft 38 and crank 48, and forces the piston 47 rearwardly into the rear end of the cylinder 45, while the piston 67 descends in the cylinder 64 and rotates the crank 68, cam shaft 57 and cam 60 clockwise, and the pinions 63, meshing with pinions 62, rotate the cam shaft 56 and cam 59 counterclockwise, which allows the bridge 49, pins 50 and the mold base 9 to descend to their initial positions, while the lower side of the bridge 49 engages the nuts 53 and, through the pins 51 draws the core 10 down within the mold to its initial position. The lever 37 is then swung upwardly and, through the medium of the arm 34, slot 36 and pin 35, the mold head 12, die 13 and the die-operating members are moved rearwardly until the top of the mold is uncovered, as shown in Fig. 4. The valve-operating lever 89 is then swung further upwardly until its pin 93 depresses the valve stem 95 and opens the valve 81, whereupon fluid under pressure passes from the supply pipe 79 through the valve duct 78 and its arm 83, valve 81 and pipe 88 into the lower end of the cylinder 70, and raises the piston 71, connecting member 72 and push rods 76, and the upper ends of said push rods engage the lower side of the mold base 9 and push the mold base 9 and the molded block 15 upwardly in the mold until the molded block is ejected from the mold, as shown in Fig. 3 of the drawings. The lever 89 is then swung down until its pin 93 releases the valve stem 95, which allows the inlet valve 81 to close under the influence of its spring, and the pin 97 depresses the valve stem 99 and opens the valve 85, which allows the pressure fluid to be exhausted from the lower end of the cylinder 70, through the pipe 88, valve duct arm 83 and exhaust valve 85, whereupon the piston 71, connecting member 72, push rods 76 and mold base 9 descend to their initial positions, as shown in Fig. 1.

Means are provided for removing one mold 1 from the machine and substituting therefor another mold, for molding objects of different shapes and sizes, which means will now be described.

The mold box 6 is detachably secured on the top of the frame 24 by means of a plate 100 and bolts 101 and 102, the bolts 101 securing the lower portion of said plates to the sides of the frame 24 at the top thereof, and the bolts 102 detachably securing the lower end of the mold box at its sides to the upper portion of said plates. The section of the pipe 87, between the pipe 86 and the cylinder 45, is telescopic, the upper section 103 of said pipe 87 telescoping over the lower section 104 thereof, and a fluid-tight joint 105 being located at the lower end of the section 103. The lower end of the section 104 is pivotally connected to the pipe 86 by a hinge joint 106 to permit the telescopic pipe 87 to swing to permit the mold head 12 to swing over the top of the mold box 6 or away from the top of the mold box.

To remove the mold from the machine the bolts 102 are unscrewed from the mold box 6; the pins 35, which are screw seated in the guide plates 27, are turned until their inner ends are withdrawn from the slots 36 in the arms 34; and the mold box 6, together with its head 12 and parts mounted thereon, are lifted off the frame 24, the section 103 of the pipe 87 sliding off the upper end of the section 104 of said pipe. Another mold may then be substituted for the mold removed; the mold box 6 being secured on the top of the frame 24 by the bolts 102; the pipe section 103 being slipped over the pipe section 104; and the pins 35 turned until their inner ends enter the slots 36 in the arms 34.

I claim as my invention:

1. In a molding machine, a mold including a removable head and a movable base member, means for moving said head over the top of the mold or from over the top of the mold, a bridge, push pins upstanding from said bridge into the mold under said base member, cams engaging said bridge for raising or lowering said bridge and push pins, power-actuated means for turning said cams for raising said bridge, push pins and said mold base member, for compressing plastic material in the mold between said mold base member and said head, ejecting rods upstanding through said bridge into the mold under said base member, and means for elevating said ejecting rods for further raising said base member for ejecting the compressed and molded block from the mold.

2. In a molding machine, a mold including a core, a mold base member, a mold head and mold-head die, means for moving said head and die over the top of the mold or away from the top of the mold, means for moving said mold-head die into molding position in the top of the mold, a bridge, push rods upstanding from said bridge into the mold under said mold base member, cams engaging said bridge for raising or lowering said bridge and push rods, rods depending from said core and slidable through said bridge, nuts on the lower end of said core rods for engaging the under side of said bridge, nuts on said core rods above said bridge, and power-actuated means for turning said cams for moving said bridge upwardly, for causing said bridge to engage said nuts above it to project the upper end of said core into said die, and for causing said push pins to push said mold base member upwardly for compressing plastic material in the mold between said die and said base member for molding a block in said mold.

3. Mechanism as characterized by claim 2, including ejecting rods upstanding through said bridge into said mold under said base member, and means for elevating said ejecting rods for moving said base member further upwardly, when the block is compressed and molded in the mold, for ejecting the molded block from the mold.

4. In a molding machine, a mold including a base member, a removable head, a die movably mounted in said head, means for normally retracting said die within said head, and a core, power means for projecting said die into the upper end of said mold, power means for projecting the upper end of said core into said die while in molding position, power means for moving said base member upwardly in said mold, power means for further raising said base member in said mold for ejecting the molded block from the mold, operating means for said power means, and a single lever for controlling said operating means.

5. In a molding machine, a mold including a base member, a mold head and a die movably mounted in said head, means for moving said head over the top of said mold or for moving said head away from the top of said mold, a cam shaft journaled on said head, cams on said cam shaft, a crank on said cam shaft, a cylinder and piston, means for pivotally mounting said cylinder at one end on said head, a piston rod extending from said piston through the other end of said cylinder and connected to said crank, means for introducing fluid under pressure into said cylinder for moving said piston and piston rod for turning said cams for engaging and moving said die into molding position into the top of said mold, when said head is moved over the top of said mold, and means for moving said base member in said mold for compressing plastic material into shape within said mold between said base member and said die.

MORRIS A. DAVIS.